United States Patent
Aurich et al.

(10) Patent No.: US 6,991,301 B2
(45) Date of Patent: Jan. 31, 2006

(54) BRAKE SYSTEM FOR RAILWAY VEHICLES

(75) Inventors: Stefan Aurich, Friedberg (DE); Ulrich Kleeman, Munich (DE); Peter Waldmann, Munich (DE); Peter Firsching, Munich (DE); Manfred Vohla, Munich (DE)

(73) Assignee: Knorr-Bremse Systeme fuer Schienenfahrzeuge GmbH, Munich (DE)

( * ) Notice: Subject to any disclaimer, the term of this patent is extended or adjusted under 35 U.S.C. 154(b) by 190 days.

(21) Appl. No.: 10/645,565

(22) Filed: Aug. 22, 2003

(65) Prior Publication Data

US 2004/0046442 A1 Mar. 11, 2004

Related U.S. Application Data

(63) Continuation of application No. 09/830,179, filed as application No. PCT/EP99/08015 on Oct. 22, 1999, now Pat. No. 6,669,308.

(30) Foreign Application Priority Data

| Oct. 23, 1998 | (DE) | 198 48 992 |
| Oct. 23, 1998 | (DE) | 198 48 994 |
| Oct. 23, 1998 | (DE) | 198 48 995 |
| Oct. 23, 1998 | (DE) | 198 48 990 |

(51) Int. Cl.
 *B60T 13/70* (2006.01)

(52) U.S. Cl. .............. 303/15; 303/3; 303/7; 303/9

(58) Field of Classification Search .......... 188/33, 188/34, 41; 303/7, 20, 15, 22.6, 3, 9, 2, 122.15, 303/128, 85; 105/4.3
See application file for complete search history.

(56) References Cited

U.S. PATENT DOCUMENTS

| 4,316,640 A | 2/1982 | Cripe |
| 4,753,174 A | 6/1988 | Berg et al. |
| 4,773,336 A | 9/1988 | Orb |
| 4,817,536 A | 4/1989 | Cripe et al. |
| 5,074,624 A | 12/1991 | Stauble et al. |

(Continued)

FOREIGN PATENT DOCUMENTS

| DE | 2 105 564 | 8/1972 |
| DE | 26 11 924 C2 | 9/1977 |
| DE | 28 01 778 A1 | 7/1979 |
| DE | 38 33 922 A1 | 4/1990 |
| DE | 40 22 671 A1 | 1/1992 |
| DE | 43 39 570 A1 | 5/1995 |
| DE | 196 34 567 A1 | 3/1998 |
| DE | 198 19 094 A1 | 5/1999 |
| DE | 198 48 992 A1 | 5/2000 |
| DE | 198 48 994 A1 | 5/2000 |
| DE | 198 48 999 A1 | 5/2000 |
| EP | 0 363 827 A2 | 4/1990 |

(Continued)

Primary Examiner—Robert A. Siconolfi
Assistant Examiner—Melanie Torres
(74) Attorney, Agent, or Firm—Barnes & Thornburg LLP

(57) ABSTRACT

The invention relates to a brake system for a railway vehicle. Said brake system comprises a main air reservoir line which is fed by an air compressor unit. Every bogie truck is provided with at least one compressed-air line which is connected to the main air reservoir line either directly or via a stop valve, a non-return valve and a compressed-air reservoir. The compressed-air line feeds, for example, the service brake valves for impinging the brakes of the bogie truck or a control unit for the spring-loaded brake and/or other control units for other auxiliary components. The service brake valves and/or the spring-loaded brake and/or other auxiliary components are controlled via at least one local, electronic brake control unit.

12 Claims, 6 Drawing Sheets

U.S. PATENT DOCUMENTS

| | | | |
|---|---|---|---|
| 5,201,834 A | * 4/1993 | Grazioli et al. | 246/169 R |
| 5,255,962 A | 10/1993 | Neuhaus et al. | |
| 5,303,657 A | 4/1994 | Oda et al. | |
| 5,503,469 A | 4/1996 | Cunkelman | |
| 5,538,331 A | 7/1996 | Kettle, Jr. | |
| 5,638,276 A | 6/1997 | Hart | |
| 5,681,015 A | 10/1997 | Kull | |
| 5,791,744 A | 8/1998 | Wood et al. | |
| 6,050,650 A | * 4/2000 | Hart | 303/15 |
| 6,238,010 B1 | 5/2001 | Barber et al. | |
| 6,250,723 B1 | 6/2001 | Barberis et al. | |

FOREIGN PATENT DOCUMENTS

| | | |
|---|---|---|
| EP | 0 526 871 A1 | 2/1993 |
| EP | 0 855 319 A2 | 7/1998 |
| EP | 0 873 927 A2 | 10/1998 |
| EP | 0 930 211 A1 | 7/1999 |
| WO | WO 93/01076 | 1/1993 |

* cited by examiner

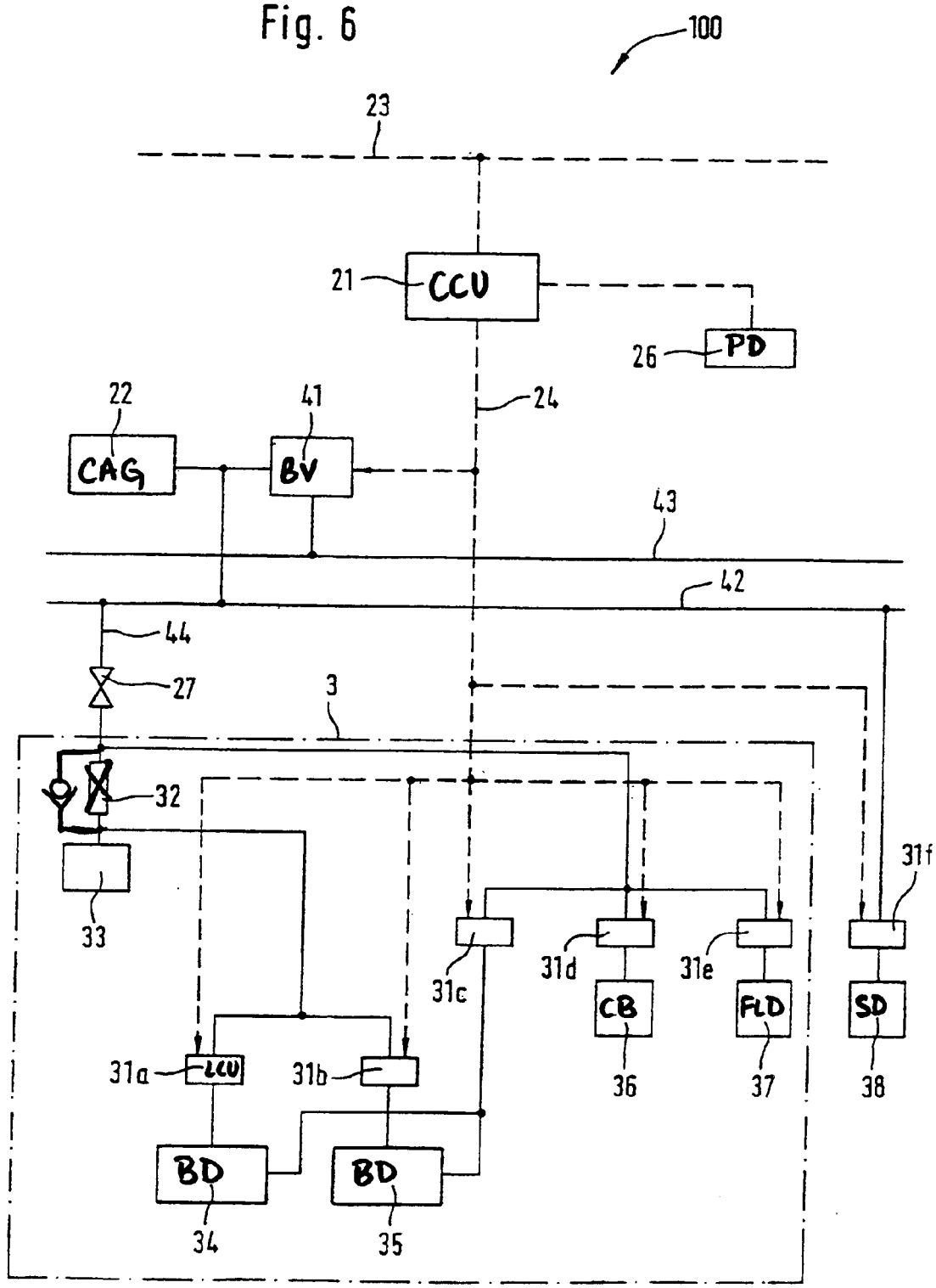

BRAKE SYSTEM FOR RAILWAY VEHICLES

CROSS-REFERENCE

This application is a continuation of U.S. application Ser. No. 09/830,179 filed on Aug. 2, 2001, now U.S. Pat. No. 6,669,308, which is a 371 of Application No. PCT/EP99/08015, filed Oct. 22, 1999.

BACKGROUND AND SUMMARY OF THE INVENTION

The present invention relates to a pneumatic brake system for a railway vehicle as well as to a bogie and as well as to a brake control unit.

Modern brake systems for railway vehicles comprise components which are to be controlled pneumatically and/or hydraulically as well as electronically. In the standard-gauge railway domain, pneumatic systems are usually used, by means of which the braking devices of the railway vehicle as well as additional auxiliary units, such as the spring-loaded brakes, the wheel flange lubrication system, the cleaning block, the sanding device, etc., are controlled. For this purpose, the railway vehicle has a compressed-air generating device which, as a rule, directly feeds a main air reservoir line as well as, by way of a train brake valve, a main air line. The braking device of the train vehicle and the auxiliary units are in this case supplied with compressed air by the main air reservoir line. For this purpose, auxiliary units of the train formation, such as door opening devices, are also controlled by the main air reservoir line. The main air line supplied by way of the train brake valve is used for controlling the individual car brakes of a train formation and can also be utilized as an additional control for the brake systems of the train vehicle.

However, such a construction requires extensive pneumatic installations in the train formation and particularly between the engineer's cab and the bogies of the train vehicle. As a result, the freedom of construction is limited when such railway vehicles are further developed because considerable space is required. Other disadvantages are the weight of these installations and the expenditures required particularly for the mounting. Such a pneumatic control unit is known, for example, from European Patent Document EP 0 855 319 A2.

From German Patent Documents DE-AS 21 05 564 and DE 28 01 778 A1 by the same applicant, for example, electro-pneumatic brakes for railway vehicles are known. In U.S. Patent Documents U.S. Pat. No. 5,503,469 and U.S. Pat. No. 5,538,331, electro-pneumatic brake systems are also described in which central computers are used as the control unit in order to simplify the system and save components, such as microswitches. In addition, the central computer permits a linking of different electro-pneumatic vehicle systems by means of a corresponding programming. From German Patent Document DE 28 40 262 C2, it is finally known to process current operating data in a central computer and take data into account when controlling the braking devices.

German Patent Document DE 38 33 922 A1 as well as European Patent Document EP 0 363 827 A2 by the same applicant disclose a brake system for railborne bogie vehicles which has a hydraulic pressure supply unit in each of the bogies.

From German Patent Document DE 40 22 671 A1, an electronic brake system for road vehicles is known whose electronic system has a decentralized construction, with a central module and several wheel modules. Furthermore, in German Patent Document DE 43 39 570 A1, an electronic brake system for motor vehicles or road vehicles is described which has a central module and brake modules assigned to the brake circuits or wheel groups or wheels, which brake modules receive defined desired brake pressure values from the central module. The brake pedal is connected with a master brake cylinder. The central module is to carry out antilock system/wheel slip control system computations and is responsible for the brake power distribution to the wheels of the road vehicle. Further, German Patent Document DE 196 34 567 A1 describes an electronic brake system for motor vehicles.

German Patent Document DE 26 11 924 C2 describes a bolster bogie for fast-travelling railway vehicles in the case of which the axles are supported by way of the axle bearing housing by means of a primary suspension on the approximately H-shaped bogie frame and are pivotally connected to the latter by means of spring leaf control arms. By way of pneumatic springs, the bolster rests on spring troughs. The pneumatic springs are acted upon by compressed air from auxiliary air reservoirs arranged in the bolster. Furthermore, International Patent Document WO 93/01076 describes a bogie for railway vehicles capable of travelling at high speed having an auxiliary air reservoir fastened on the bolster support.

In addition, German Patent Document DE 43 22 716 A1 discloses a frame for commercial vehicles which is constructed of a front-axle partial frame, a center partial frame and a rear-axle partial frame. The front-axle partial frame and the rear-axle partial frame consist of side member segments connected with cross members. The central second partial frame takes over the function of the actual side members and connects the first partial frame with the third partial frame. In this case, closed structural parts of the side member segments of the central partial frame may be constructed as operating medium storage devices. Furthermore, German Patent Document DE 39 40 250 A1 discloses pressure medium reservoirs arranged in a motor vehicle or in a passenger car in support member profiles.

A device for detecting and monitoring the braking effect of a railborne traction vehicle in the event of an emergency braking is suggested in German Patent Document DE 195 10 755 A1. In order to achieve, in the case of a braking device for a train formation, which consists of several train units with at least one traction vehicle and several pertaining train vehicles respective, a delay-free braking operation and avoid an unnecessary operation of the control valves in the train formation, it is suggested in German Patent Document DE 197 39 444 A1 that, for the synchronous admission of pressure medium to the pressure line by the control valves, the train bus is in a bidirectional communication with a command apparatus, the train bus controlling the brake valves in the train formation for the synchronous operation of the brakes.

For simplifying the system, German Patent Application DE 195 13 004 A1 suggests a combination of the electronic and pneumatic or hydraulic control and/or monitoring elements of the brake system in a unit in the engineer's cab. This construction method has the advantage that the installation expenditures are reduced at least in the vehicle construction. However, also in this type of construction, an extensive pipework is required between the engineer's cab and the bogies of the railway vehicle in order to permit the pneumatic controlling of the brake units and auxiliary units.

Furthermore, such brake systems for a railway vehicle must have emergency braking devices by means of which the railway vehicle can reliably be stopped in the event of a disturbance. For this purpose, conventional brake systems have pneumatic devices which, for example, when an emergency brake is operated, start the operation of the brakes of the vehicle. This takes place, for example, by means of purely pneumatic operating lines or by electric signal lines which control emergency brake valves which operate according to the quiescent-current principle.

This system, which has been successful in practice, however, has the disadvantage that considerable expenditures are required for its implementation. Vehicles, which are equipped with an electric emergency brake signal line, must be equipped with purely mechanical-pneumatic elements for adapting the braking power to the situations, for example, the loading condition. In addition to high-expenditure pneumatic components, an extensive laying of pipes is also required for this purpose.

In addition, a considerable number of corresponding devices acting upon the pneumatic system are required so that also a passenger can initiate an emergency braking signal. Even when a disturbance occurs at a different point in the pneumatic system, an emergency braking has to be automatically initiated.

The known emergency system therefore requires extensive installation expenditures. This has a disadvantageous effect on the costs for material and mounting. It is another disadvantage that this system is relatively heavy, which has a disadvantageous effect on the energy consumption during the operation of the railway vehicle.

It is therefore an object of the invention to provide a brake system for a railway vehicle in which the control system is simplified.

In a particularly advantageous manner, the installation expenditures between the engineer's cab and a bogie can be reduced according to the invention. In this case, by means of the at least one compressed-air line, auxiliary units can also be operated, in addition to the service brake. As a result, the system is significantly simplified and the material and mounting expenditures are lower than in the case of known methods of construction. In addition, the weight of the entire arrangement can also be reduced.

In a particularly advantageous manner, a decentralizing of the electronic brake control unit by means of local electronic brake control units in the bogies permits also a displacement of the necessary pneumatic devices into the bogies, whereby the expenditures for the pipework are significantly reduced. The object of the pneumatic system is therefore limited according to the invention to the initiation of the desired function at the site, that is, in the bogie, while the controlling of these functions can take place by way of the electronic system. Significantly lower expenditures are necessary for the electrical wiring required for this purpose than for the pneumatic controlling according to the prior art. In particular, the space requirement for the control devices and the weight can be reduced significantly. Furthermore, the mounting expenditures are considerably reduced. The constructive expenditures for the overall system is further reduced in this manner, in which case a modular construction of the decentralized control devices can be achieved with a prior mounting in the bogies.

It is another advantage that the reliability of the system is also increased in this manner. If, in the case of the brake system according to the invention, a single local brake control unit of several control units fails, this does not yet decisively impair the operability of the overall brake system of a train formation.

As a result of the fact that the local brake control unit has available on its input side signals of the presetting device operable by the engineer and signals of local devices for detecting actual operating values—such as slip, axle load, rotational wheel speed, actual deceleration and bogies load—and/or signals of devices for the monitoring and automatic operational management (ATO, ATC, ATP), these can advantageously be taken into account during the respective braking operation. The braking performance of the railway vehicle and of the train formation can therefore be controlled in a still more exact manner.

In particular, as a result, actual operating data can be exchanged between the individual decentralized modules, whereby the stability of the train formation in the event of a braking is further increased. The braking performance of the railway vehicle can therefore be maintained in a comparable manner also in the case of the most different railway vehicles and environmental conditions, which significantly increases the comfort, for example, in passenger trains.

When, by way of a central railway vehicle data bus, the brake signals are led to at least one gateway constructed as the suitable interface, from where these and corresponding brake signals are transmitted by way of a central braking data bus to the local brake control units, railway vehicles of different constructions with a different vehicle process control technique can also be combined with one another and together can use the brake system according to the invention. The gateway constructed as the interface permits an adaptation of the data format to the respective railway vehicle type and its control logic.

When, in contrast, only railway vehicles with a process control construction of the same construction are connected with one another, the brake signals can advantageously alternatively be transmitted directly from the central railway vehicle data bus to the local brake control units. As a result, the constructional expenditures for the brake system are reduced further.

It is also advantageous for the local brake control unit to be placed, with respect to the axle and/or the bogie, within the bogies or on the car body in the area of the bogie. This module can then be assembled beforehand, which simplifies the assembly of the overall system. It is further achieved in this manner that the local brake control unit is arranged in the proximity of the area in which it is to carry out its effect. This reduces the expenditures for the control logistics and, in particular, only short line routes are required.

When the local device for detecting current operating values is arranged with respect to the wheel and/or with respect to the axle and/or in the bogie, here also, these data can be detected at the site and can be transmitted along a short route into the local brake control unit. Long connection lines with the resulting danger of damage to these lines can therefore be avoided and the data can be utilized directly.

It is also advantageous for the respective local brake control unit to have data available by means of which a linking of signals of presetting devices can take place with signals of the operating-value detection device. This information can then be effectively used for optimizing the braking operation.

When, by means of the data available to the local brake control unit, a conversion of the brake signals takes place such that a wear of the brakes can be achieved which is as uniform as possible, the maintenance intervals for the railway vehicle can be extended. As a result of the uniform wear of the brakes, these are then also utilized in a more optimal manner, because the brakes on a single railway vehicle must are always exchanged jointly even if some of the brake linings are not yet worn down. This causes advantageous savings.

As a result of the fact that the local brake control units, the train control unit, the presetting devices in the control stations, the bogies and optionally the local operating value detection devices are linked with one another by way of a safety loop, a still more reliable emergency braking system can also be provided. This further increases the safety of the brake system.

When the local brake control unit has a local electronic control system, a "fail-safe" device and a pressure control, a controlled braking can be carried out also in the event of an emergency braking, which controlled braking takes into account, for example, vehicle parameters and actual operating values as well as an antiskid control. This system can therefore reliably carry out, for example, an emergency braking in which the length of the brake path is frequently not particularly important.

It is another advantage for the pressure control to preferably have two series-connected, electro-pneumatic valves for regulating the brake pressure by ventilating or bleeding corresponding to the present desired brake signal value and the present antiskid information. As a result of the two series-connected valves, desired pressure conditions or reaction times can be better adjusted.

When the two valves are constructed as solenoid valves with a preferably low performance, the switching consumption can be minimized, while fast reaction times can nevertheless be achieved.

As a result of the fact that the pressure control has a flow intensifier arranged downstream of the two valves, a sufficient pneumatic pressure or a sufficient fluid flow rate can be provided at the brake cylinders. As a result, better switch characteristics can be achieved in the brake system according to the invention.

In addition, according to the invention, a reliable emergency braking system can be implemented at lower constructive expenditures when an emergency braking is triggered by means of an electric signal, the triggering of the emergency braking being monitored by a fail-safe device which activates a fall-back level when the emergency braking is not correctly implemented. Thus, the emergency braking system of the known constructions, which is characterized essentially by pneumatic components, is replaced by a system in which the controlling of the emergency braking system utilizes the capabilities of the electronic control system of the railway vehicle for initiating and implementing an emergency braking. The electric emergency braking system is utilized for triggering the emergency braking and in the process is monitored by a fail-safe device. As a result, it is ensured that, in the event of an incorrectly operating electronic control system, an emergency braking is nevertheless initiated because, by means of the fail-safe device, a fall-back level can be activated.

The present invention results in a particularly reliable safety system. Furthermore, the installation expenditures and the space requirement for the electrical line are significantly lower than those for the pneumatic line in conventional systems. Also, the weight of the entire safety device can be significantly reduced. The brake system according to the invention can therefore produced more rapidly and at lower cost.

As a result of the fact that, during the operation without emergency braking, the above-mentioned electric signal is transmitted in the form of a normal operating signal by way of an electric safety line, a constantly available and reliable disturbance monitoring system can be produced in a simple manner. In contrast to the pneumatic system in which a certain operating pressure is constantly applied which is maintained by means of high-expenditure devices, the electric signal can be provided in a simple manner by means of known devices.

It is another advantage for the emergency braking to be triggered in the event of an emergency braking by a corresponding emergency braking signal or the cessation of a normal operating signal. This creates the possibility of triggering such an emergency braking passively as well as actively. The reason is that if the line for the electric signal in the train formation is interrupted, for example, by the tearing-off of a vehicle or the like, this will automatically lead to an emergency braking without any additional intervention by a person. However, in addition, the train engineer or a passenger can also, by way of an emergency braking device, initiate a corresponding emergency braking signal, or cause the interruption of the electric signal. In this case, the interruption of the normal operating signal is the constructionally simpler variant.

By using the electronic control system also for emergency braking, in contrast to conventional brake systems, the same actuators (electro-pneumatic valves) can also be used for adjusting the emergency brake pressure. This further reduces the constructional expenditures. The desired pressures can be adjusted very well in this manner.

As a result of the fact that, in the normal operation, the controlling of the service brake valves as well as the activating of the control unit for the spring-loaded brake and/or of the additional control units for the additional auxiliary units takes place by local electronic brake control units, which are connected with one another by way of a common braking data bus, the braking performance at the individual axles can be mutually coordinated. The braking operation can therefore be controlled even better. This permits particularly a taking-into-account of vehicle-specific values, such as the type, length and weight of the train formation.

This is particularly useful in the case of engineer-caused emergency braking or safety braking in order to ensure a stopping under defined conditions in the event of a failure of the braking-related devices. For this type of braking, a certain safety must be ensured without always requiring a stopping distance which is as short as possible. This type of emergency braking therefore ensures that the vehicle is caused to stop, in which case a stressing of a passenger because of occurring decelerations on the railway vehicle can be controlled within certain ranges.

When the brake system has a main air line, which is fed by way of a train brake valve by the compressed-air generating device, which operates the brake by way of a control valve, the invention can also be used in railway vehicles constructed in this manner.

As a result of the fact that, when the fall-back level is activated, a preset brake pressure is fed to the brakes, it is ensured that a sufficient brake pressure can be provided when an emergency braking is required.

If the preset brake pressure is a fixedly set brake pressure which remains unchanged during the operation, the constructional expenditures for the brake system can be further reduced because control elements can be eliminated.

When the brake pressure is adapted to the load of the vehicle, the braking operation can be carried out in a still more targeted and more controlled manner.

Furthermore, the invention can provide a brake system for a railway vehicle in which the constructional expenditures for the control system of the service brake and possible auxiliary units are reduced because the check valve and/or the compressed air reservoir can be arranged in the bogie. As a result of this constructional decentralizing of the brake system, the devices required for the function can advantageously be arranged where they are to have their effect. Since, as a result, only one feed line from the main air reservoir line is required between each bogie and the vehicle body, the constructional expenditures between these areas are significantly reduced.

Another advantage is the fact that, in this manner, very short pipe paths occur in the bogie, for example, for the distribution of the control pressure to the individual axles. As a result, the costs for the material as well as the weight of the arrangement can be reduced.

It is also an advantage that the check valve and/or the compressed-air reservoir can be mounted beforehand in the bogie and the final assembly of the railway vehicle is therefore significantly simplified. As a result, more favorable manufacturing sequences can be achieved, which has advantageous effect on the manufacturing duration and the costs.

The brake system according to the invention also permits a significant logistic simplification with respect to known systems, whereby it can be monitored in a more reliable and simpler manner.

Another advantage is the fact that more space for other devices is available in the vehicle body. In this case, the arrangement of the check valve and/or of the compressed-air reservoir in the bogie is relatively unproblematic because sufficient space exists here. Furthermore, the constructive possibilities for the design of the railway vehicle are expanded.

As a result of the fact that the frame or other constructive elements of the bogie are constructed at least in sections as compressed-air reservoirs, the space requirement in this area can be further reduced. In this case, the frame structure of the bogie usually produced as a welded construction is utilized in a particularly favorable manner. Thus, hollow spaces existing in the frame of the bogie, in addition to their static utilization, will have an additional use. This reduces the constructive expenditures because no additional compressed-air reservoir has to be arranged in this area. The tightness in the frame required for receiving the compressed air can be produced by conventional means by seal welding, etc.

As an alternative, the frame or other constructive elements of the bogie can also be used, at least in sections, for receiving the compressed-air reservoir. The clearances existing in the frame structure will then be advantageously utilized so that the space requirement for the compressed-air reservoir can be minimized. In this case, it is also possible to construct the frame structure as a partially or completely closed covering in one area and to insert the compressed-air reservoir. The frame can then also be used as a protective element for the compressed-air reservoir against outside influences.

When at least one other control unit is used as a monitoring unit for monitoring the triggering of an emergency braking, the advantage of an increased protection against failure is obtained. The emergency braking safety line is connected with the control unit and the fail-safe device. As a first control step, the latter monitors an output signal of the control unit in order to ensure that the control unit has correctly initiated the controlled emergency braking. Should this not be so, a switching to the pneumatic fall-back level is caused; that is, a pneumatic emergency braking of the system is caused. The use of another control unit as an additional monitoring unit or second control step helps to ensure that a switching to the pneumatic fall-back level really only has to take place in an absolute emergency. It also permits an improved checking and load-dependent controlling of a correctly initiated controlled emergency braking, so that vehicle specific data and actual operating values can be taken into account during the implementation of the emergency braking on the basis of the comparative values of the additional monitoring unit or second control step in a more differentiated manner. This results, for example, in an improved slip control and thus in an optimal utilization of the coefficient of adhesion for achieving a required stopping distance and also helps to avoid wheel flats as well as resulting repair costs. Even in the event of a failure of the first monitoring unit, a reliable emergency braking will be ensured in this manner. The additional monitoring unit or second control step can preferably be housed in another, second bogie.

According to another aspect of the present invention, a bogie for a railway vehicle is provided in which the frame is constructed at least in sections as a compressed-air reservoir. This bogie according to the invention is characterized by a functional multiple utilization. Thus it is normally used also for the bearing of the axles and for receiving the load applied by the car body. In addition, it is used as a hollow body in which compressed air can be stored. The bogie according to the invention therefore represents a particularly advantageous module for simplifying a railway vehicle. As a result, important constructive, assembly-related and financial advantages can be achieved.

As an alternative, according to another aspect of the invention, a bogie is provided for a railway vehicle, in the case of which the frame and/or other constructive elements of the bogie are constructed at least in sections for receiving a separate compressed-air reservoir. As a result, it is possible to receive in the interior of the bogie a compressed-air reservoir, which is therefore arranged in a protected manner, without the requirement of significant additional space.

When a check valve of a compressed-air line is arranged in or on the bogie, which check valve is provided for feeding compressed air from the main air reservoir line to service brake valves for acting upon brakes of the bogie or for feeding the control unit for the spring-loaded brake and/or additional control units for other auxiliary units, a bogie module can be provided which already integrally has important devices required for controlling a brake system. Thus, such a bogie can advantageously contribute significantly to reducing the mounting expenditures for a railway vehicle.

According to another aspect of the present invention, a brake control unit is provided for a brake system of a railway vehicle, which is characterized in that the brake control unit is arranged in the bogie, braking signals being supplied by way of a central braking data bus to the brake control unit, and the brake control unit being provided for controlling service brake valves and/or for controlling the spring-loaded brake and/or for controlling additional auxiliary units.

The brake control unit according to the invention can thus be used as a module, which is independent per se, on the bogie and permits freedom with respect to the vehicle construction. Furthermore, the above-discussed additional advantages can be achieved by means of this brake control unit.

Other objects, advantages and novel features of the present invention will become apparent from the following detailed description of the invention when considered in conjunction with the accompanying drawings.

BRIEF DESCRIPTION OF THE DRAWINGS

FIG. 6 is another representation of the brake system according to the invention.

DETAILED DESCRIPTION OF THE PREFERRED EMBODIMENTS

Figure 1:
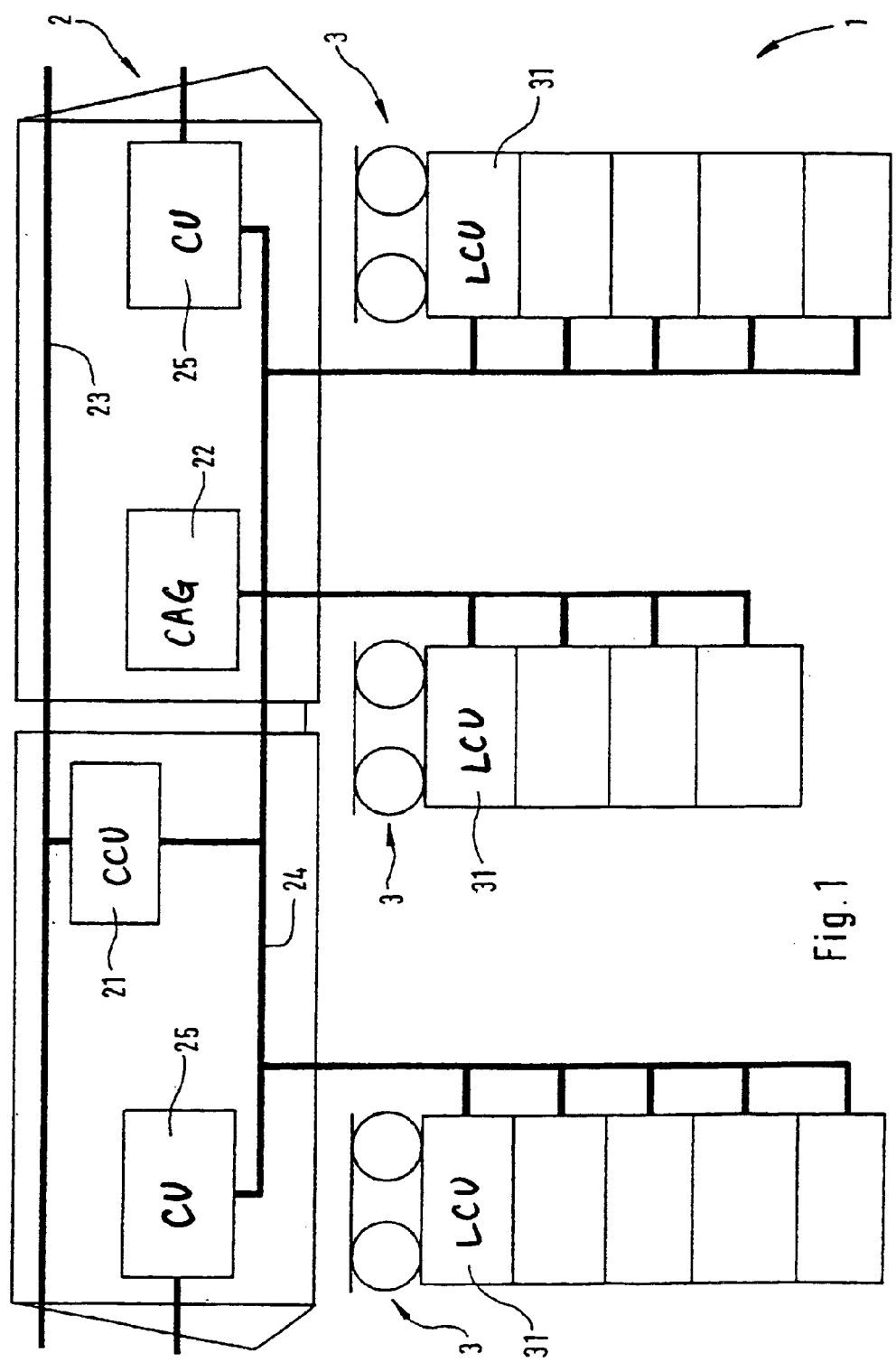
FIG. 1 is a schematic view of the construction of the brake system according to the invention.

According to the schematic representation in FIG. 1, a railway vehicle 1 essentially has a vehicle body 2 and, in the present embodiment, has three bogies 3. The railway vehicle 1 is illustrated here as a traction vehicle, in which case additional driven or non-driven vehicles can be coupled for forming a train formation.

FIG. 1 illustrates the electronic controlling of the brake system of the railway vehicle 1. A central control unit 21 and a compressed-air generating device 22 are arranged in the vehicle body 2. By means of a vehicle data bus 23, the central control unit 21 receives operating data concerning the entire railway vehicle or the entire train formation. The control data for the brake system of the railway vehicle derived therefrom are transmitted by way of a braking data bus 24 to the air generating device and the local control units 31 and optionally also existing function modules in the bogies 3. By way of connection units 25, these data can also be transmitted to additional vehicles of a train formation. The pneumatic devices are shown in FIG. 2.

Figure 2:
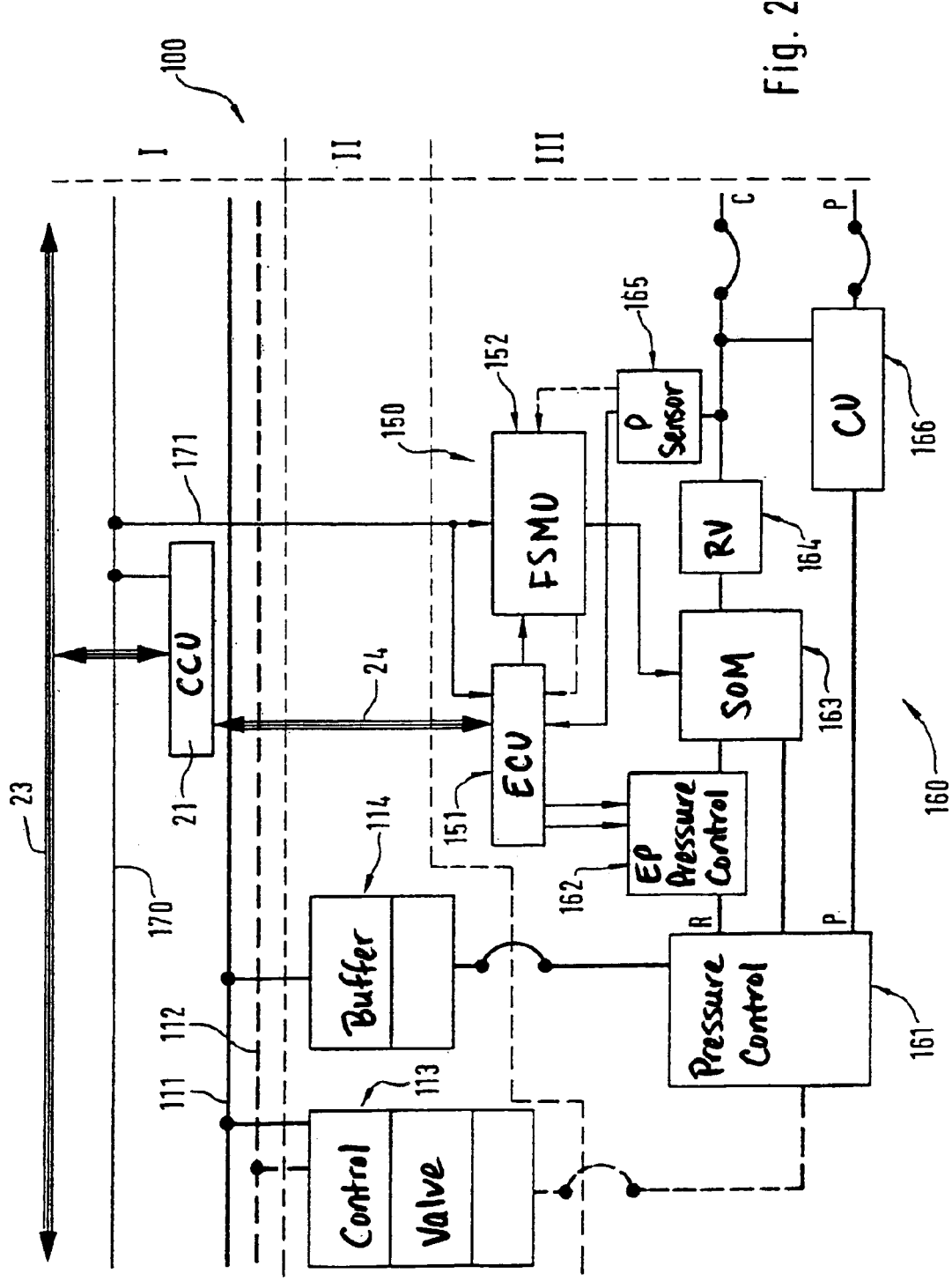
FIG. 2 is a schematic overview of detailed devices of the brake system according to the invention on a bogie.

FIG. 2 is a detailed view of an embodiment of the brake system 100. In this case, the brake system 100 extends on the whole over three levels of the railway vehicle 1, which in FIG. 2 on the right-hand side, are marked by Roman numerals I, II and III. In the area marked I, the devices are shown which are arranged in the vehicle body 2. II shows the devices arranged in the car body 2, while III indicates the electric and pneumatic modules arranged in a bogie 3.

Addition to the electric lines, FIG. 2 also shows pneumatic lines. Thus, a pneumatic brake module 160 is fed by a compressed-air line 111 and, in this embodiment, by a pneumatic control line 112. The pneumatic control line 112 and the compressed-air line 111 act upon a control valve 113 with a load-dependent pressure limitation and a shut-off device, which is arranged in the car body. In addition, the pneumatic pressure in the compressed-air line 111 is applied to a buffer device 114 for the supply pressure with a shut-off device which is also arranged in the car body.

The output pressures of the control valve 113 and of the buffer device 114 are fed to a pressure control 161 in the bogie. By way of an electro-pneumatic pressure control device 162, a switch-over module 163 and a relay valve 164 acting as a flow intensifier, this pressure control system 161 sets the desired brake cylinder pressure at an output point C. This output pressure is monitored by a pressure sensor 165.

The pressure control 161 also acts upon a control unit 166 for a parking brake P.

The local brake control unit 150 arranged in the bogie has an electronic control unit 151 and a fail-safe monitoring unit 152.

As illustrated in FIG. 2, the control unit 151 is supplied by way of the braking data bus 24 with control signals from the central brake control unit 21. Furthermore, a loop 171 connects an emergency braking safety line 170 with the control unit 151 and the fail-safe monitoring unit 152. The control unit 151 controls the electro-pneumatic pressure control device 162. When the loop 171 indicates that an emergency braking is required, the fail-safe monitoring unit 152 will also monitor an output signal of the control unit 151 in order to ensure that the control unit 151 has correctly initiated the emergency braking.

If this is not so, the fail-safe monitoring unit 152 will act directly onto the switch-over module 163 and cause a switching to the pneumatic fall-back level, that is, the pneumatic emergency braking of the system.

When the control unit 151 has initiated a correct emergency braking, this emergency braking is carried out in a controlled manner; that is, vehicle specific data and/current operating values can be taken into account during the implementation of the emergency braking, such as a slip control.

As also illustrated in FIG. 2, the central brake control unit 21 can also be connected with the emergency braking safety line 170 in order to act by way of the braking data bus 24 onto the decentralized control unit 151. In the case of a corresponding further development of the electronic control unit 151 for processing such additional data, it is, however, also possible that this control unit 151 carries out the emergency braking independently and decentralized from the central brake control unit 21.

FIG. 2 shows the system construction on a driving axle or a bogie of the railway vehicle 1. The constructional elements arranged in the car body 2 and particularly the devices provided in the bogie 3 are provided on each individual car body or bogie, the vehicle-body-side central brake control unit 21 requiring only one per vehicle or train formation.

In the following, the function and structure of the decentralized brake control module will be explained in detail. It carries out the following functions on a bogie:

- Controlled setting of a required brake cylinder pressure for the bogie or for each individual axle;
- antiskid control: Detection and analysis of the rotational axle and wheel speeds. When unacceptably high slip values occur during the braking, a rapid change of the brake cylinder pressure set with respect to the bogie or axle is determined and the brake cylinder pressure is corrected correspondingly rapidly;
- determination of the loading condition of the bogie, for example, from the two bellows-seal pressures; and
- monitoring and diagnosis of all influenced electro-pneumatic and sensing components.

The decentralized brake control module according to this embodiment is conceived for the controlling of active brake cylinders. As explained above, the module described as an example is composed of a compact valve component unit 160, an electronic control system 150 adapted to the control function as well as monitoring component unit required for ensuring the signal-related reliability of the module. In addition to the mechanical components, this module may also include standardized functional software. The brake control module receives a braking demand preferably by way of two signal paths: The brake system bus 24 and the emergency braking loop 171.

In this case, each braking demand is processed electro-pneumatically by means of the electronic control system 150 and corresponding solenoid valves as actuators. Thus, also the signal of the emergency braking loop is read in and processed by the electronic control unit. A braking triggered by way of this signal path is load-corrected and supported by the antiskid control.

In the event of a serious malfunctioning of the electronic/electro-pneumatic control, the brake control module also has the purely pneumatically implemented fall-back level which, in the event of a braking demand by way of the emergency braking loop sets a fixed brake pressure which is not load-corrected and has no antiskid control.

Figure 3:
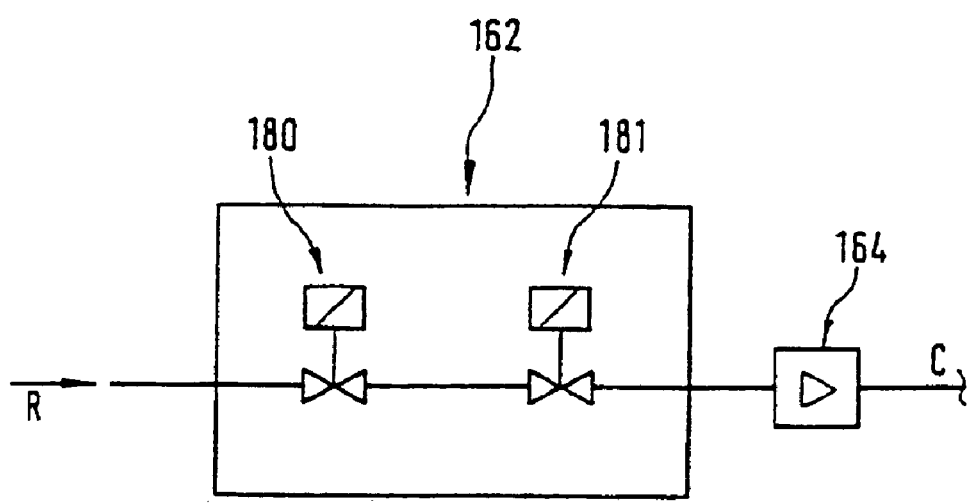
FIG. 3 is a detailed view of the electro-pneumatic pressure control device of the brake system.

FIG. 3 shows a portion of the electro-pneumatic pressure control device 162 and particularly the two series-connected electro-pneumatic valves 180 and 181. In this case, valve 180 is used for the pressure buildup, while the other valve 181 permits the pressure reduction. As a result, while the air flow rate is low, fast reaction times can be achieved. The flow rate intensifier 164 on the output side finally provides a sufficient amount of compressed-air flow, so that the brake cylinder can be acted upon by the desired brake pressure.

Figure 4:
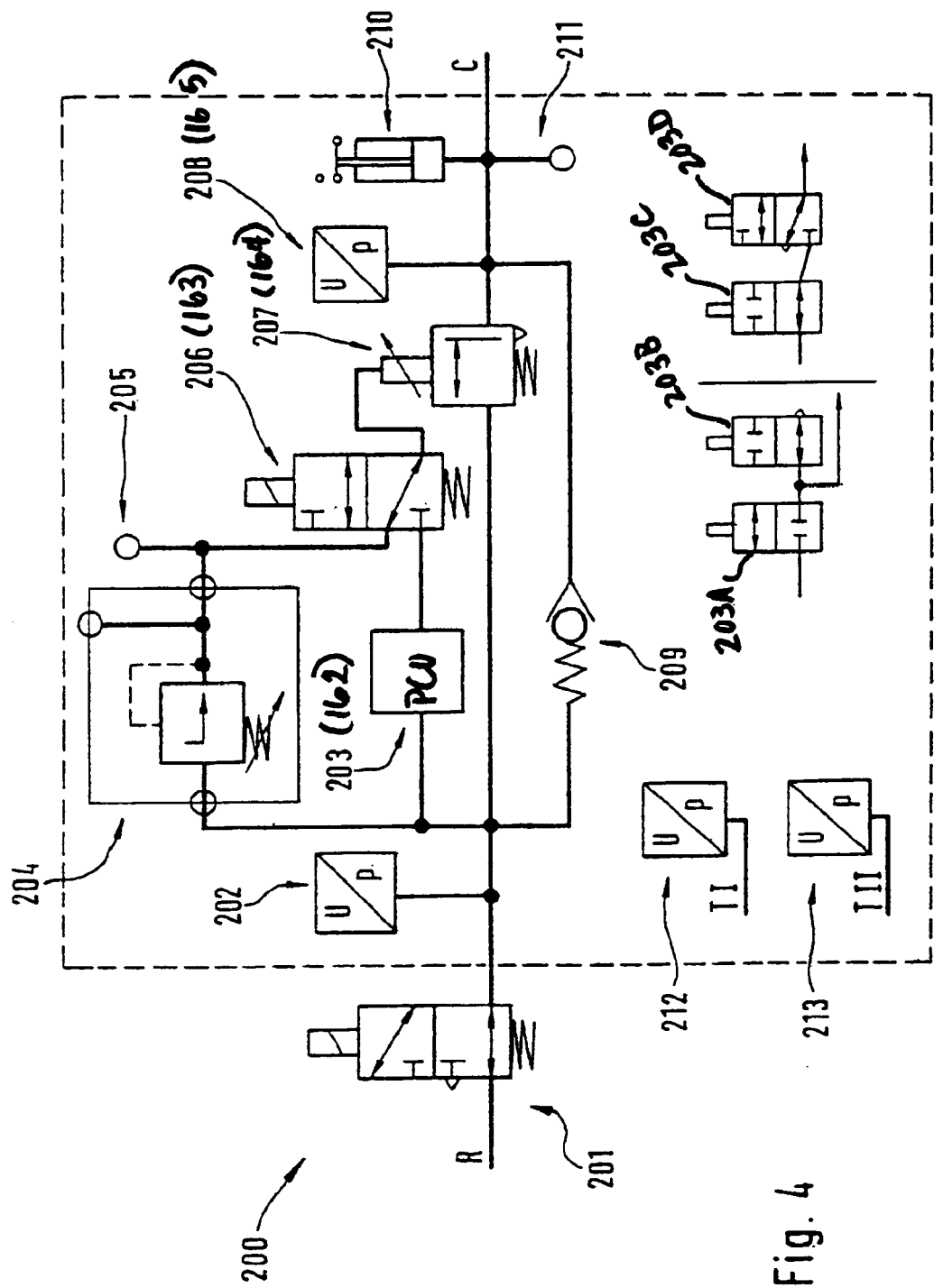
FIG. 4 is a schematic representation of the pneumatic brake module.

FIG. 4 shows an example of a structure of the pneumatic control suitable for implementing the defined functions.

A pneumatic control 200 arranged in the bogie first has an auxiliary discharge valve 201 on the side of the external feeding. By way of a pressure sensor 202, the pneumatic pressure is guided to the pressure control valve 203 and parallel thereto to the pressure reduction valve 204. A control connection port 205 is connected in front of the adjoining emergency braking switch-over valve 206.

On the output side of the emergency braking switch-over valve 206, a relay valve 207 is connected, to which, in addition, the input air pressure is directly applied. At the output of the relay valve 207, another pressure sensor 208 is provided for detecting the braking pressure. A check valve 209 is, in addition, connected parallel to this arrangement. After the relay valve 207, a pressure switch 210 and a control connection port 211 are also provided by means of which the brake can be released. The pneumatic pressure emitted by the relay valve 207 acts upon the brake cylinder. Also, additional T-pressure sensors 212 and 213 are provided.

These components will be described in detail in the following:

The pressure sensor 202 measures the supply pressure occurring at the module 200. The two sensors 212 and 213 are used for the individual detection of the load pressures of the two air bellows springs in order to obtain information about the load condition of the railway vehicle. As an actuator of the pressure control circuit, the pressure control valve 203 contains two switching valves, as illustrated in FIG. 3. In the not triggered condition of the two valves, a pressure occurs which is equal to 0 bar. In this case, two 2/2-way valves can be used, in which case the first valve can be constructed as an NC (ventilator) 203A and the second valve 203B can be constructed has an NO (bleeder). As an alternative, the second valve 203D can also be a 3/2-way valve. These pressure control valves are controlled by the electronic system and are supplied with a stabilized voltage. In the present embodiment, this voltage amounts to nominally 24 volt.

The pressure reduction valve 204, which is connected parallel to the pressure control valve 203, is used for adjusting a pressure which is set as the brake cylinder pressure when the pneumatic fall-back level is activated. The emergency braking switch-over valve 206 activates the pneumatic fall-back plane in the event of a disturbance of the electronically-assisted braking function.

The relay valve 207 on the output side is used for intensifying the air flow rate. In this case, it meets the ventilating and bleeding gradients required for the antiskid function.

The pressure sensor 208 after the relay valve 207 is used for detecting the actual value of the braking pressure which represents a control quantity of the pressure control circuit. In this case, the sensor meets the precision sufficient for the pressure controlling and its inputs are designed for the electronic control system of the module.

In the case of an axle-type control, these elements exist essentially twice.

Figure 5:
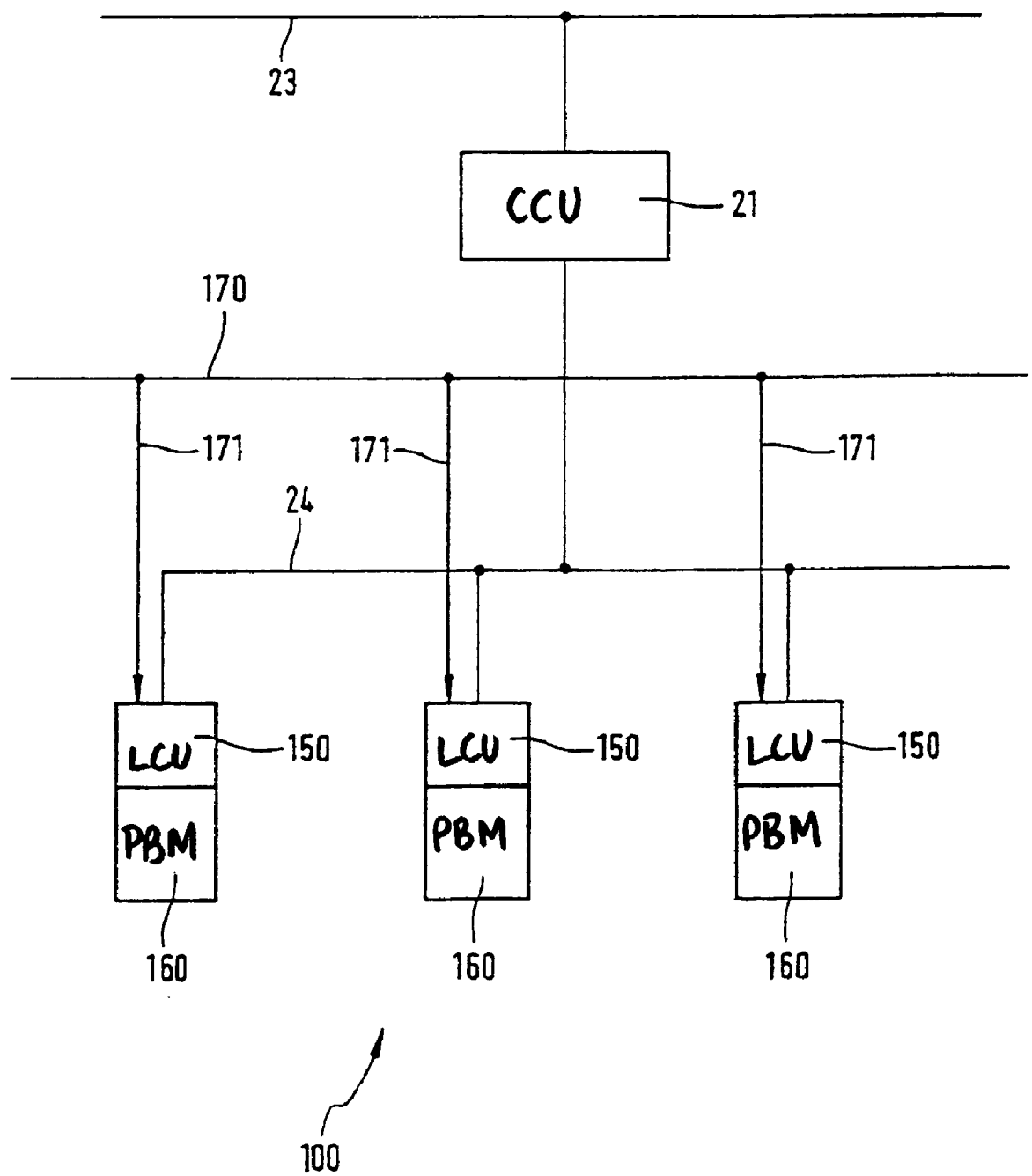
FIG. 5 is a schematic representation of the signal paths for a brake system according to the invention.

FIG. 5 is a schematic overview of the emergency braking device in the train formation. In this case, the brake system 100 has the central electronic brake control unit 21 which is supplied by way of a data bus 23 of the railway vehicle or the train formation with the vehicle-specific information and current operating data. From the central brake control unit 21, the braking data bus 24 leads to the plurality of local brake control units 150 which are each arranged in a bogie 3. Each local brake control unit 150 is coupled to a pneumatic brake module 160 which is supplied with compressed air by the pneumatic system of the railway vehicle 1. Each pneumatic brake module 160 has braking devices and devices interacting therewith and is controlled by the respective local brake control unit 150.

In addition, the brake system 100 has the electric emergency braking safety line 170 which is connected by way of loops 171 with the local brake control units 150. The emergency braking safety line 170 extends through the train formation and, during the operation, is acted upon by an electric signal. If this signal is interrupted, this triggers in the local brake control units 150 the implementation of an emergency braking in the train formation.

The pressure control in the system is implemented by the pressure control circuit, the braking demand (desired braking value by way of the braking data bus, hard-wired braking demand) transmitted to the decentralized brake control module is processed as a desired pressure value by the pressure control circuit. The pressure control circuit is formed by a pressure controller implemented by software (electronic control system), a pressure sensor and the pertaining analog input (input amplifier and AD-converter) of the electronic control system for detecting the controlled variable, line terminals of the electronic control system, electro-pneumatic pressure control valves as actuators and the relay valve for the pneumatic intensification of the flow rate.

In this case, the repeatability in the brake cylinder pressure control in a distributed brake control system is more important in practice than the absolute precision of the set pressure value because a vehicle engineer always expects a constant braking performance and pays less attention to the exact brake pressure. The effects of external actuating variables, such as the temperature, the drift, the aging, a fluctuating supply etc., on the components must therefore be taken into account.

The brake control module according to the invention is designed for controlling the service brake and emergency brake of a bogie. It contains the continuous brake pressure control in the defined pressure range, the setting of an emergency braking pressure and an antiskid function. For the bogie module, a defined failure behavior is required; that is, a clearly defined condition of the brake occurs in every operating condition:

If the electronic system is operating perfectly, the brake is released or can be adjusted by the braking demand;

if the electronic system is operating perfectly and an emergency braking is triggered, the brake is activated with a load correction and antiskid control;

if the electronic system is operating in a faulty manner and no emergency braking is triggered, the brake is released;

if the electronic system is operating in a faulty manner, the brake is activated with a fixed stage.

Furthermore, the brake system according to the invention carries out an antiskid control, in which case an antiskid control circuit permits the maintaining of an acceptable slip value also during poor coefficient of adhesion conditions between the wheel and the rail. A skidding of the vehicle is effectively prevented by the antiskid control circuit. For this purpose, it consists essentially of rotational speed sensors at the wheel sets or at the transmission for detecting the actual wheel speed, of a processing logic implemented by software which is used for computing a reference speed as a measurement of the actual vehicle speed and for determining actuating commands for influencing the brake cylinder pressure in the event of the occurrence of excessive slip values at individual wheel sets, and of a suitable actuator for influencing the set brake cylinder pressure.

In the case of the decentralized brake control module, the brake cylinder pressure can also be influenced exclusively by way of the pressure control. Here, the antiskid control is applied to the pressure control valves either parallel to the pressure controller or it uses the pressure control circuit as an actuator.

FIG. 6 schematically illustrates additional details of he brake system 100 on a bogie 3. The electric lines are shown in FIG. 6 by means of broken lines. Pneumatic lines are indicated as solid lines. The devices arranged in a bogie 3 are illustrated in a dash-dotted frame.

The electronic control system therefore has the central control unit 21 which, from the vehicle data bus 23 and, in addition, from a predefining device 26 acted upon by the operator of the railway vehicle, receives the data required for controlling the brake system. Thus, information concerning the type of the train formation, its length, mass, speed is available to the central control unit, as well as current operating values, such as the slip, the axle load, the rotational wheel speed, the actual deceleration and the bogie load can be taken into account. These data are emitted by the central control unit 21 and are fed by way of the braking data bus 24 to each local control unit 31. For illustrating the method of operation, this local control unit 31 is divided in FIG. 6 into individual control unit sections 31a to 31f for different devices to be controlled. By means of the braking data bus 24, a train brake valve 41 is also controlled.

The pneumatic system of the railway vehicle 1 has the compressed-air generating device 22 by which a main air reservoir line 42 is fed. In addition, by way of the train brake valve 41, a main air line 43 is fed. By way of corresponding devices, the individual vehicles of a train formation can be connected to the main air line 43. In this case, a pressure is defined at which the train brakes are completely released. This pressure can be set such by means of the central control unit 21 that the railway vehicle is braked in the desired manner.

The main air reservoir line 42 is used for controlling the braking devices of a bogie 3 of the traction vehicle. For this purpose, a compressed air line 44 branches off the main air reservoir line 42 and guides compressed air by way of a shut-off valve 27 to a check valve 32 arranged in the bogie 3 and to a compressed-air reservoir 33. This compressed-air reservoir 33 is used for ensuring the usability of the braking devices of each bogie 3 in the event of a failure of the main air reservoir line 42.

Further, in this embodiment, the local control units 31a to 31e are coupled to this compressed-air line 44. In this case, the local control units 31a and 31b have service brake valves, by means of which the required brake cylinder pressure in brake devices 34 and 35 can be adjusted in a continuous manner.

Furthermore, the compressed air line 44 also supplies the local control unit 31c by means of which spring-loaded brakes in the braking devices 34 and 35 can be activated.

The compressed-air line 44 also supplies a local control unit 31d, by which cleaning blocks 36 can be controlled. In addition, a local control unit 31e is supplied which is used for controlling a flange lubricating device 37.

In the present embodiment according to FIG. 6, another local control unit 31f is also indicated which does not necessarily have to be arranged in the bogie 3 and is used for activating a sanding device 38. However, these devices 38 can also be coupled directly to the compressed-air reservoir line 42 instead of being coupled to the compressed-air line 44.

In the present embodiment, the train brake valve 41 as well as the brake valves in the local control units 31a and 31b operate according to the quiescent-current principle. In the event of a disturbance of the system, the train brake valve 41 therefore bleeds the main air line, while the brake valves ventilate the braking devices 34 and 35. As a result, an emergency braking is triggered.

In FIG. 6, the invention is explained on the example of a bogie 3. According to its type and construction, the railway vehicle 1 can have a different number of bogies 3. As a rule, the leading vehicle has two or, as illustrated in FIG. 1, three bogies 3. As explained above, these bogies 3 are constructed as decentralized modular systems which are coupled by the vehicle body 2 also by way of the braking data bus 24 and the compressed-air line 44.

In order to be able to minimize the size in the bogie 3, the compressed-air reservoir 33 can be constructed integrally at the frame of the bogies 3 by seal-welding a partial area thereof. As an alternative, the compressed-air reservoir 33 can also be installed in a partial area of the bogie frame. Furthermore, according to the invention, the check valve 32 can also be arranged on the bogie frame.

The check valve 32 and/or the compressed-air reservoir 33 can be provided once per bogie 3 or individually for every axle. Furthermore, only the check valve 32 or the compressed-air reservoir 33 can be arranged in the bogie.

In addition, the local brake control units can also utilize signals of devices for the monitoring and automatic operational management, such as ATO (Automatic Train Operation), ATC (Automatic Train Control) or ATP (Automatic Train Protection), for controlling the braking operation.

Additional details of the brake system according to the invention are the object of German Patent Applications with the Reference Numbers DE 198 48 990.0, DE 198 48 992.7, DE 198 48 994.3 and DE 198 48 995.1 on which the priority is based and to whose complete disclosure content reference is made here.

The invention therefore provides a brake system for a railway vehicle in which local electronic brake control units contribute to a significant simplification of the supply logistics. As a result, not only the constructive expenditures on the railway vehicle can be significantly reduced but, in all operating conditions, the required braking functions are also provided in order to be able to cause a reliable stoppage of the railway vehicle.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A brake system for a railway vehicle having at least two bogies comprising:
   a main air reservoir line fed by a compressed-air generating device;
   a compressed-air line connecting the main air reservoir line to pneumatic brake units and auxiliary pneumatic units independent of the pneumatic brake units on each bogie;

a central control unit controlling the pneumatic brake units and the auxiliary units by local electric brake control units, which are mutually connected by a common braking data bus; and the local electronic brake control units being in the bogie or on a car body in the area of the bogie.

2. The brake system according to claim 1, including a main air line fed by the compressed-air generating device under the control of a train brake valve; and the central control unit controls the train brake valve by a local electronic brake control unit, which is connected to the common braking data bus.

3. The brake system according to claim 1, wherein signals of a predefining device which can be operated by a train engineer, signals of local devices for the detection of current operating values including one or more of slip, axle load, rotational wheel speed, actual deceleration and bogie load, and signals of devices for the monitoring and automatic operational management (ATO, ATC, ATP) are available to the local electronic brake control unit on the input side.

4. The brake system according to claim 1, wherein brake signals on a central railway vehicle data bus are received by the central control unit and corresponding brake signals are transmitted by braking data bus to the local electronic brake control units.

5. The brake system according to claim 4, wherein brake signals are transmitted directly from the central railway vehicle data bus to the local electronic brake control units.

6. The brake system according to claim 1, including a local device for detecting current operating values, including one or more of slip, axle load, rotational wheel speed, actual deceleration and bogie load, is arranged with respect to a wheel and/or with respect to an axle and/or in the bogie; and the respective local electronic brake control unit is connected to the local device and use data available from the local device in controlling the brakes.

7. The brake system according to claim 6, wherein by means of the data available to the local brake control unit, a conversion of the brake signals takes place such that a wear of the brakes can be achieved which is as uniform as possible.

8. The brake system according to claim 1, wherein the local electronic brake control units, a train control unit, a predefning device in an engineer's cabs, the bogies and a local operating value detection devices are linked with one another by a safety loop.

9. The brake system according to claim 1, wherein the compressed-air line connects each bogie with the main air reservoir line via a shut-off valve, a check valve and a compressed-air reservoir, and the check valve and the compressed-air reservoir are in the bogie.

10. The brake system according to claim 9, wherein the control unit for the brakes and the control units for additional pneumatic devices are connected to the shut-off valve before the check valve.

11. The brake system according to claim 1, wherein a frame and/or other constructive elements of the bogie are constructed at least in sections as a compressed-air reservoir.

12. The brake system according to claim 1, wherein a frame and/or other constructive elements of the bogie are provided at least in sections for receiving a compressed-air reservoir.

* * * * *